Sept. 15, 1959     W. W. SIMMONDS     2,903,948
MULTIPLE RAM COMPACTOR
Filed Jan. 13, 1956     5 Sheets-Sheet 1
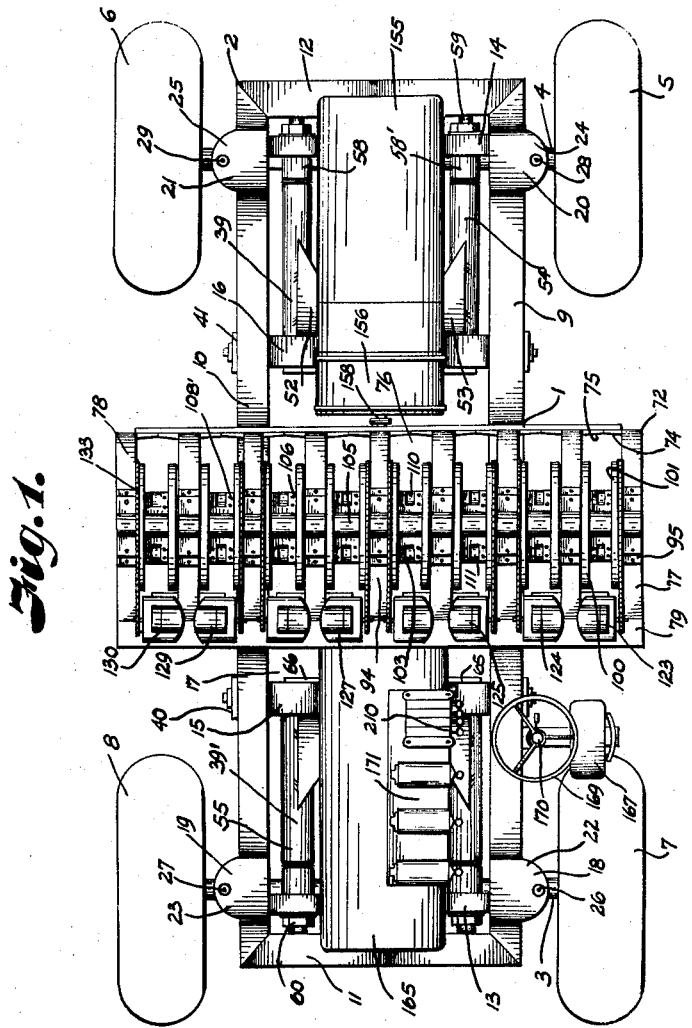
INVENTOR.
Wayne W. Simmonds.
BY
ATTORNEYS.

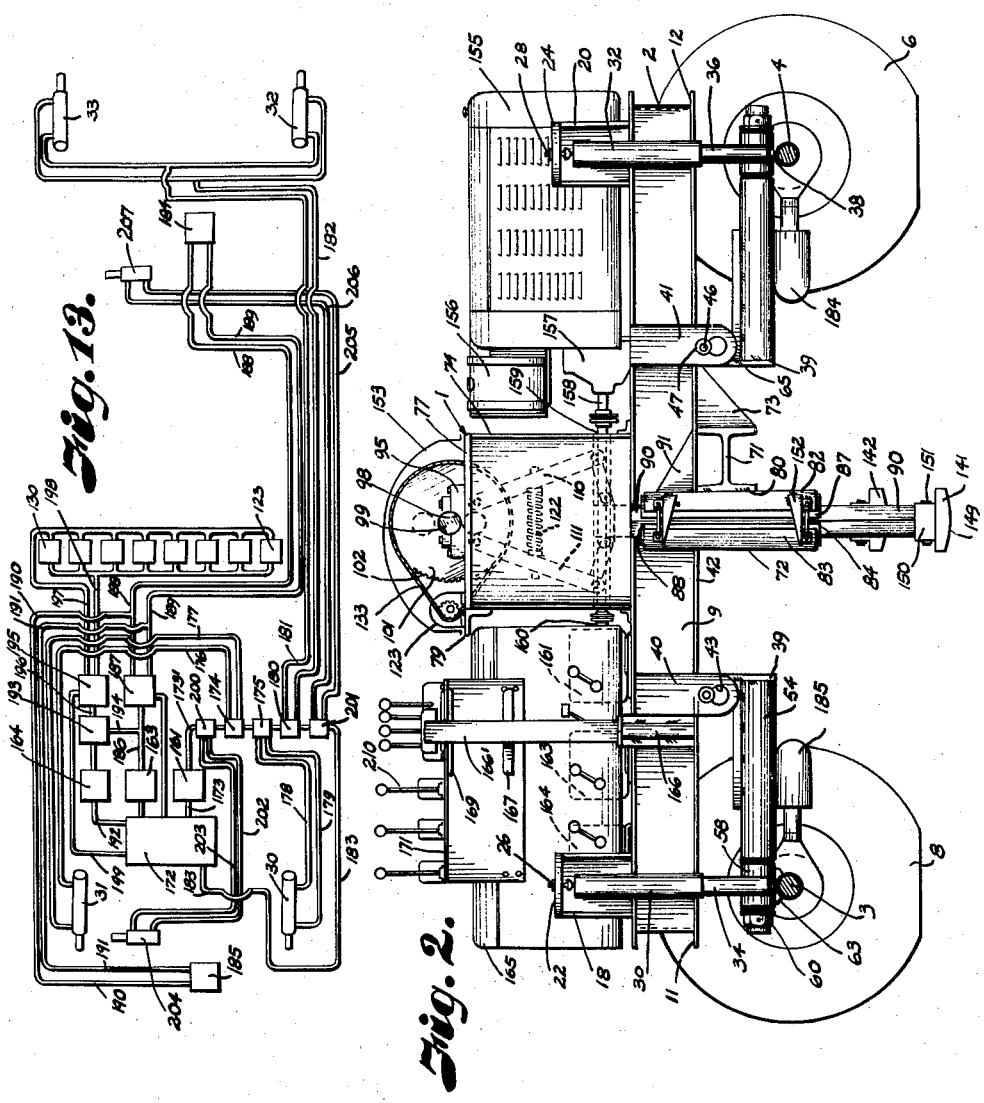

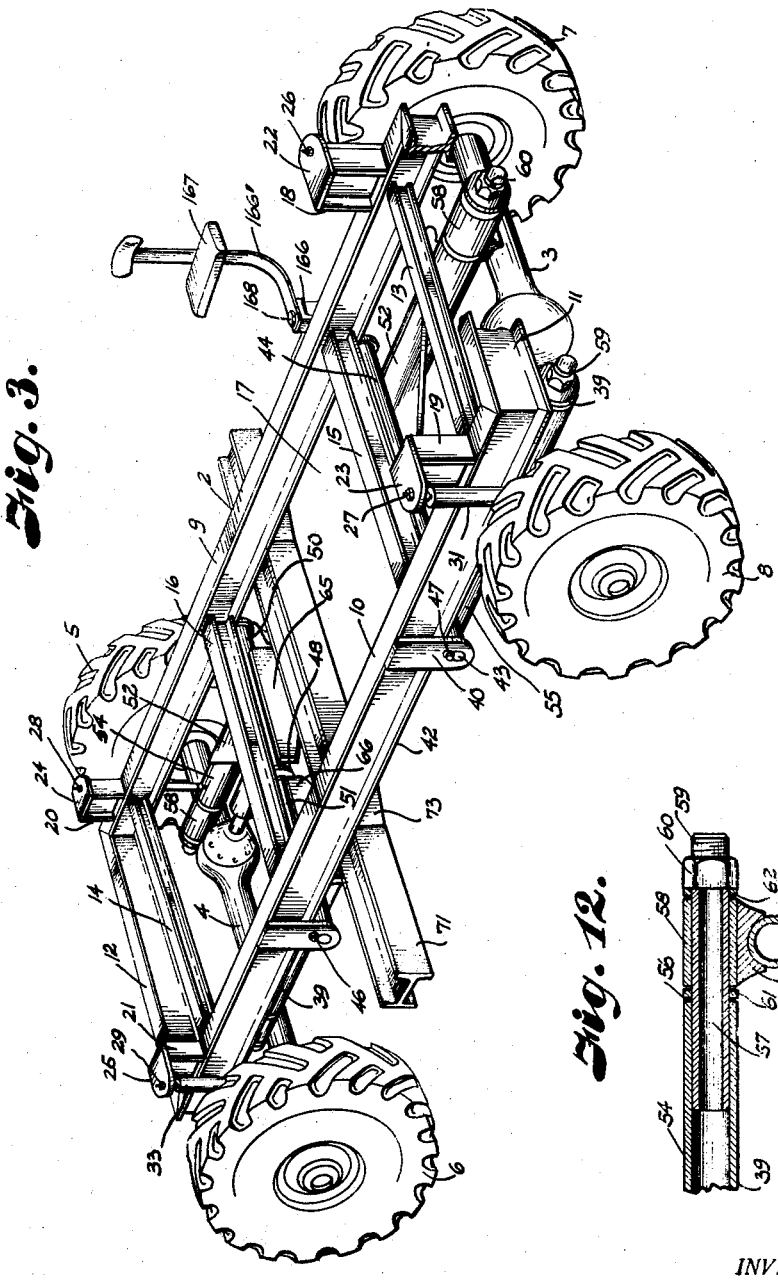

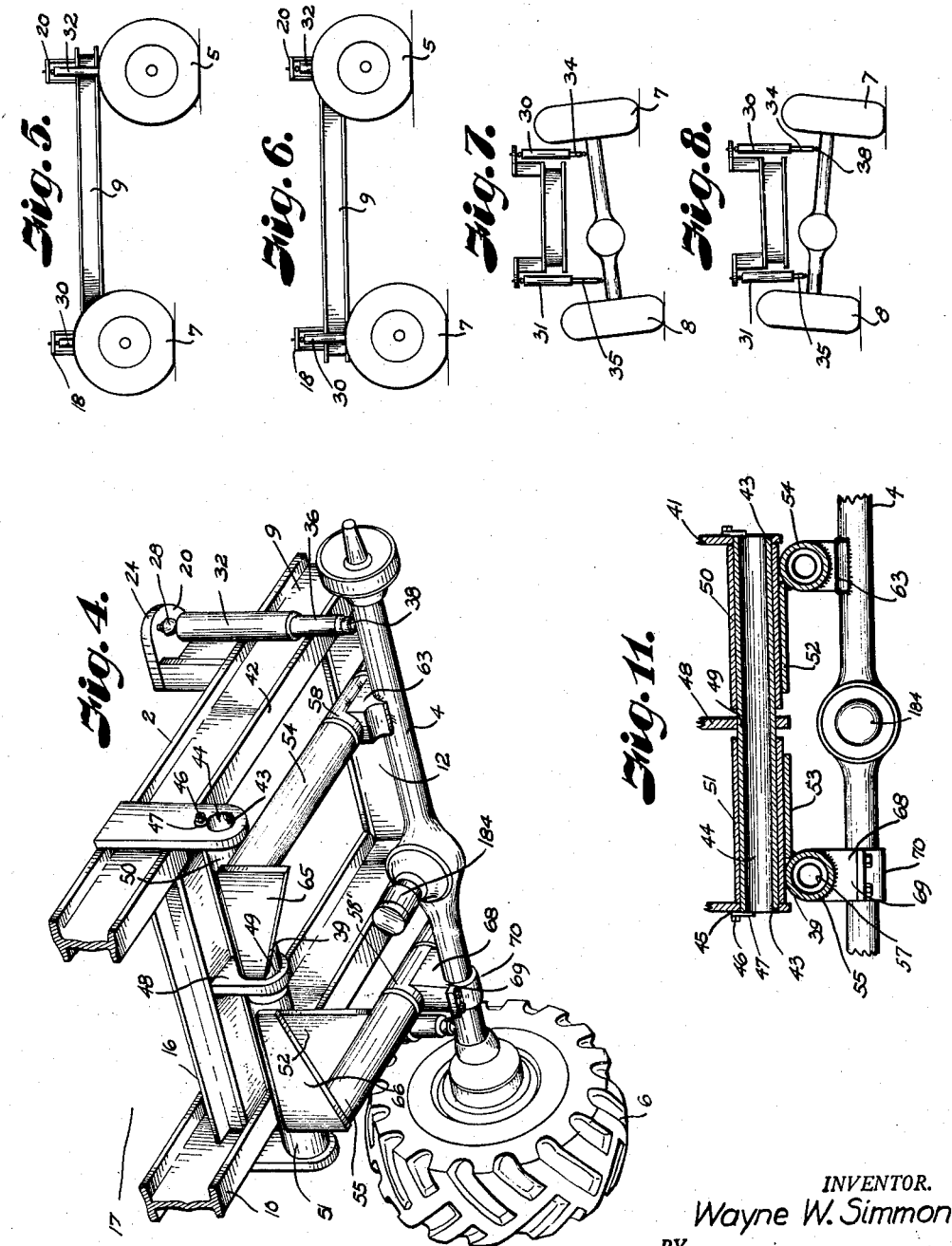

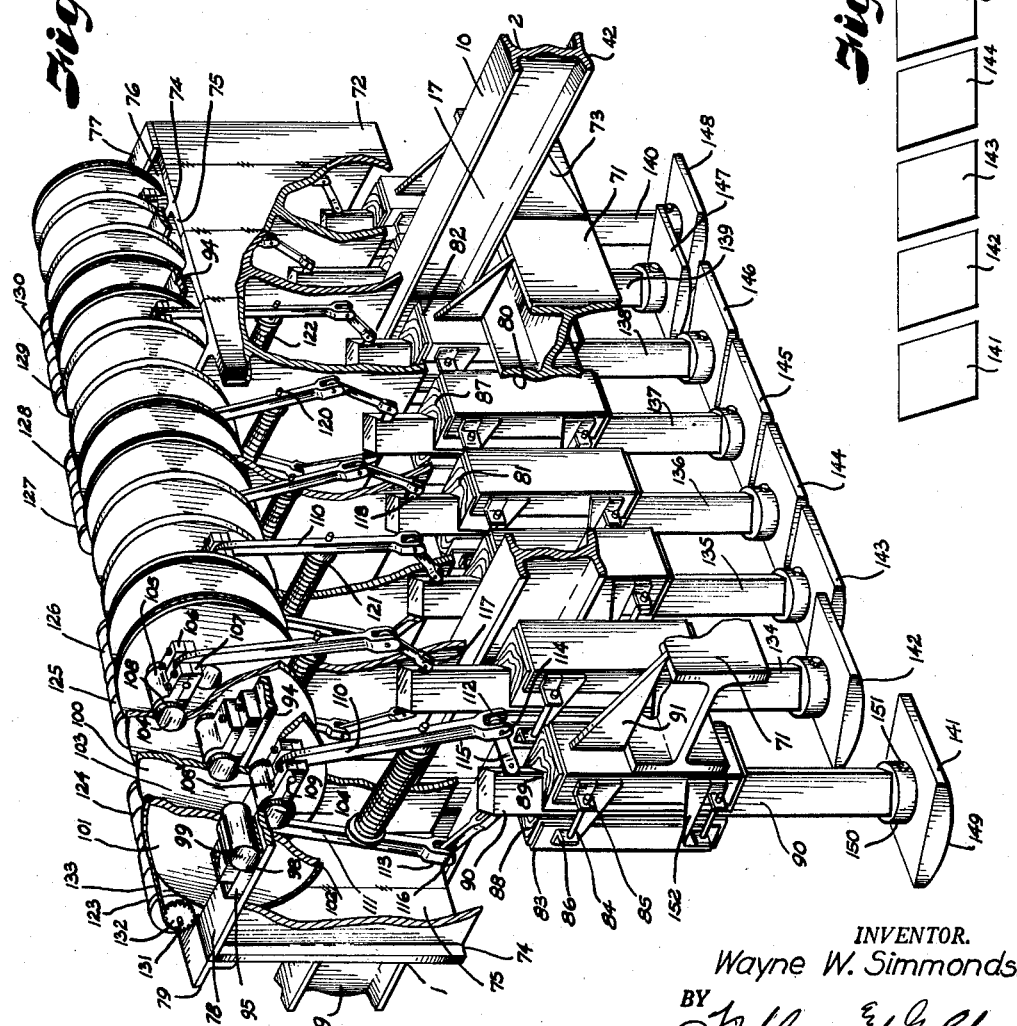

United States Patent Office 2,903,948
Patented Sept. 15, 1959

2,903,948

MULTIPLE RAM COMPACTOR

Wayne W. Simmonds, Tulsa, Okla., assignor to John H. Lucas, Kansas City, Mo., trustee for Wayne W. Simmonds and Arlie J. Simmonds Application January 13, 1956, Serial No. 558,911

2 Claims. (Cl. 94—49)

This invention relates to a compactor and tamper and more particularly to an hydraulically operated multiple tamping apparatus supported on a mobile vehicle.

The principal objects of the present invention are to provide apparatus for compacting or tamping the earth material in roadways or the like having multiple compactor units operable on a common crank shaft; to provide a frame for the vehicle with hydraulic means for movement of the frame with respect to the axle of the vehicle to accommodate the vehicle when moving over rough terrain so that the frame will be standing in a horizontal position when the tamping apparatus is in use; to provide a frame on the vehicle having longitudinal members, one of which is rigidly secured to the axle of the vehicle and the other loosely mounted thereon to take care of torque action for when leveling the frame when the vehicle wheels are on rough terrain and the hydraulic means is operated for movement of the frame of the vehicle in horizontal position; to provide a plurality of tamping members transversely of the frame of the vehicle; to provide a frame for mounting of the tamping members; to provide motors for each of the tamping members with chain and sprocket engagement of each motor to each tamping member to eliminate any twist of the crank shaft; to provide for operation of the tamping members in series or in staggered relation to dynamically balance and prevent undue stress and strain on the apparatus; to provide bearings for the shafts of the tamping members having helve link connection with the crank shaft; to provide hydraulic cylinders under the frame and secured to the axles of the vehicle to carry the load of the tamping apparatus; and to provide hydraulic means for operation of the vehicle and the tamping apparatus.

Other objects of the present invention are to provide hydraulic apparatus for driving the front and rear wheels independently and for steering of the rear and front wheels to allow for short turning of the vehicle; to provide hydraulic suspension of the frame on the wheels to raise and lower the frame with respect to the work being done and to adjust for best tamping heighth and angle of the tamping member with respect to the terrain; to provide bases or feet members on the tamping members set at an angle or bias so that the entire terrain would be covered by the tamping members; to provide means for varying the speed of the sprocket wheels whereby rotation may be controlled to vary the helve action to desired stroke length or speed; and to provide a device of this character simple and economical to manufacture.

In accomplishing these and other objects of the invention, I have provided improved details of structure, the preferred forms of which are shown in the accompanying drawings, wherein:

Fig. 1 is a plan view of my apparatus.

Fig. 2 is a side view, partly in cross section, illustrating the frame for the hydraulic tamping members and the helve link construction.

Fig. 3 is a perspective view of the vehicle frame.

Fig. 4 is an enlarged fragmentary view of part of the frame construction and particularly illustrating the longitudinal tubular members, one mounted rigidly on the axle and the other mounted pivotally thereon to take care of the torque action when the vehicle is on uneven ground.

Fig. 5 is a side view of the wheel and frame construction with the front wheels lower than the rear wheels.

Fig. 6 is a similar view showing the front wheels higher than the rear wheels.

Fig. 7 is a view of one axle with one wheel on a higher plane than the other with the hydraulic cylinders adjusted to hold the frame in horizontal position.

Fig. 8 is a view similar to Fig. 7 with the opposite wheel on a higher plane.

Fig. 9 is an enlarged perspective view of the frame for mounting of the tamping members and the motors and sprocket and chain driving mechanism with parts broken away to better illustrate the invention.

Fig. 10 is a plan view of the tamping member.

Fig. 11 is a cross-sectional view through the mounting mechanism of the frame to take care of the torque action.

Fig. 12 is a cross-sectional view through the end of the longitudinal members for mounting the frame on the axles of the tractor.

Fig. 13 is a diagrammatic view of the hydraulic fluid system.

Referring more in detail to the drawings:

1 designates a compactor or tamping apparatus embodying the features of the present invention, mounted upon a frame 2 of a vehicle having axles 3 and 4 supported by front wheels 5 and 6 and rear wheels 7 and 8. The frame comprises side rails or sills 9 and 10 of I-beam construction ends 11 and 12, also of I-beam construction. Cross bars or members 13 and 14 are secured to the web portion of the side members near the respective ends thereof and cross members 15 and 16 are spaced from the first cross members, as illustrated in Fig. 3 with their ends rigidly secured to the web of the side members by welding or the like, providing an open space 17 near the center of the vehicle.

Rigidly mounted at the respective corners of the frame 2 and spaced from the ends thereof in alignment with the axles 3 and 4, are standards 18, 19, 20 and 21 having plates 22, 23, 24 and 25 extending outwardly from the sides of the side members 9 and 10. The plates are provided with openings adapted to receive bolts or the like 26, 27, 28 and 29 which extend through the openings in the plates and have their ends secured to the ends of hydraulic cylinders 30, 31, 32 and 33 provided with pistons (not shown) having rods 34, 35, 36 and 37 with their free ends pivotally secured to the top of the axles 3 and 4, as illustrated at 38 (Fig. 4). With this arrangement, the frame is hydraulically mounted upon the axles of the vehicle, which allows the frame 2 to be raised or lowered relative to the axles 3 and 4, and also provides means for adjusting said frame to a desired inclined or level position when the wheels of the vehicle are on uneven terrain.

In order to eliminate any torque action in the frame of the construction, I provide subframes 39 and 39' at each end of the vehicle, now to be described.

Plates 40 and 41 are rigidly mounted on the outsides of the longitudinal I-beams 9 and 10 substantially in alignment with the cross bars 15 and 16. These plates extend below the lower flanges 42 of the I-beams and are provided with openings 43 in which are mounted the end of a tubular shaft 44. The plates are provided with threaded sockets, as indicated at 45, to receive stud bolts 46 extending through washers 47 for holding the shaft in place. Welded or otherwise suitably secured to the under side of the cross member 16, is a downwardly extending bracket 48 provided with an opening 49 through which the shaft 44 extends. Rotatably mounted upon the shaft 44 between the bracket 48 and the plates 40 and 41 are sleeves 50 and 51. Secured to the underneath side of the sleeves 50 and 51 respectively are plates 52 and 53 which in turn are rigidly secured by welding or other suitable means to longitudinal tubular members or arms 54 and 55 each having one open end 56. Torque sleeve shafts 57 are fixed in the tubular members or arms 54 and 55 and extend from the open ends 56 and through collars 58 and 58' and the free end portions of said torque sleeve shafts 57 being provided with threads 59 for receiving a nut 60. Washers 61 are provided between the ends of the tubular members or arms 54 and 55 and the collar 58. A washer 62 is also provided on the threaded end of the tubular member 57. The collar 58 is welded to a block 63 which has a curved portion adapted to engage the axle 4 of the vehicle and is rigidly secured thereto by welding or otherwise suitable means. The ends of the tubular members or arms 54 and 55 are rigidly secured to gussets 65 and 66 which are also rigidly secured to the plates 52 and 53 whereby each arm is rigidly secured to its respective sleeve and swings up and down on the shaft 44. The collar 58' on the tubular member 55 engages the upper curved surface of a block 68 which has a transversely curved lower surface engaging the axle 4 and removably secured to the fork 69 thereof is a saddle member 70 forming a bearing for and rotatably mounting the block 68 on the axle. With this arrangement of the sub-frame 39, the arms 54 and 55 each swing up and down about the axis of the shaft 44 and the bearing members or collars 58 are rotatable on the arms on an axis extending longitudinally of said arms, and the saddle member 70 forms a rotatable mounting of one of the arms relative to the axle housing. When the vehicle is on uneven ground, as shown engaged by the wheels in Figs. 7 and 8, as, for example, with the wheel 8 on ground lower than the wheel 7, the extensible member 30 is contracted and the extensible member 31 is extended to level the frame 9. In this operation, the tubular member or arm 55 adjacent the wheel 8 swings downwardly relative to the frame 9 about the axis of the shaft 44 and the arm 54 swings upwardly about said shaft 44, and the collars 58 and 58' rotate on the arms whereby the axle 4 is inclined relative to the frame 9. Due to the different inclinations of the arms 54 and 55, the saddle member 70 rotates on the axle to permit the swinging movement of the arms without binding.

The sub-frame 39' is identical, at the forward end of the vehicle and will not be separately described. While the tubular member at the front end of the vehicle comparable to tubular member 54 may be rigidly secured to the axle, I have found that having the rigidly secured tubular member at the opposite side of the vehicle will work equally well.

Rigidly secured to the underneath of the lower flanges 42 of the side frame members 9 and 10 is an I-beam 71 placed upon its side on which is mounted a frame 72 for supporting the tamping apparatus proper. The I-beam 71 is braced to the side members by gussets or the like 73.

The frame 72 comprises a plurality of I-beams or standards 74 placed in vertical position having their flanges 75 placed edge to edge and welded together forming a plurality of compartments 76. The outer flanges of the endmost I-beams 74 are connected by plates 77 and 78 and an angle member 79 is rigidly secured to the rear face of the vertical I-beam near the top ends thereof. The cross I-beam 71 underneath the frame is placed slightly forwardly of the center of the frame.

Rigidly mounted to the rear face 80 of the I-beam 71 in spaced relation are a plurality of elongated bearing members 81 comprising a U-shaped member 82 and an oppositely facing U-shaped plate member 83 secured together on their respective sides by bolts 84 extending through ear brackets 85 and 86 on the respective plate members. Removably secured within the U-shaped plate members 82 and 83 are oppositely facing bearing blocks 87 and 88 having substantially V-shaped inner faces defining open ways 89. Slidably engaged in said open ways is a substantially square-shaped tamping shaft 90, the opposite corners of the shaft fitting within the V-shaped faces of the bearing block. The bearing blocks may be made of wood or similar hard surface material. While I have here illustrated eight of the tamping bearings and shafts, I do not wish to be limited to any specific number, or any specific shape as it will be obvious other shapes may be used. Each of the bearing plates 82 are further rigidly supported on the I-beam 70 by gusset plates 91, as illustrated in Fig. 9.

Mounted on each of the web portions 93 of the I-beam 74 are plates 94 and mounted thereon, as well as the end plates 77 and 78, are bearing blocks 95 having bearing surfaces 98 upon which are mounted short shafts 99. Mounted upon each end of the short shafts 99 are crank discs 100 and 101 at least one of which is provided with teeth 102. The crank discs are pressed on and keyed to the short shafts at their centers and spaced therefrom are openings 103 in which are rigidly secured the respective ends of crank pins 104. The bearing member 105 engages the crank pins 104 and comprise mating plates 106 and 107 in the centers of which are bearings 108 which engage the pins. The plates are held together by bolts or the like, as indicated at 108'. Transverse pins 109 extend through the respective ends of the bearing plates. Secured to the ends of the plates by the pins 109 are arms 110 and 111 having bifurcated lower ends 112 and 113 which are pivotally connected by pins 114 to links 115 and 116, having their opposite ends bifurcated as indicated at 117 and pivotally connected to arms 118 extending outwardly from opposite sides of the tamping shafts 90. The arms 110 and 111 are provided at substantially their centers with pins 120 and on the inside of the arms are sockets or keepers 121 for receiving the respective ends of a coil spring 122.

Mounted upon the plate 79 at the rear of the frame 71 are a plurality of motors 123, 124, 125, 126, 127, 128, 129 and 130, provided with shafts 131 and sprockets 132. Each of the sprockets is connected to one of the crank discs by a chain 133.

While I have described only one of the tamper shafts and helve link connection with the pins on the crank discs and the chain connection with one motor, it will be seen from Fig. 9 that each motor drives a separate crank pin to operate the tamper shafts, i.e., the motor 123 operates shaft 70; motor 124 operates shaft 134; motor 125 operates shaft 135; motor 126 operates shaft 136; motor 127 operates shaft 135; motor 128 operates shaft 138; motor 129 operates shaft 139; and motor 130 operates shaft 140. Although no one motor operates independently of the other, thus all operate to counterbalance the crank shaft arrangement of the driving operation.

Each of the tamper shafts is provided with a tamping head 141, 142, 143, 144, 145, 146, 147 and 148. These tamping heads are illustrated in Fig. 10 and are of rectangular shape with their lower faces curved as indicated at 149 and are held on the shafts by collars 150 and set screws 151. It is noted in Fig. 10 that the tamping heads are plated on the shafts at an angle so that the entire surface of the ground will be contacted by the tamping head and not leave spaces between the heads untamped. In other words, the forward edges overlap the trailing edge of the next adjacent head.

The sides of the U-shaped members 82 are provided with brace plates 152 having a point extending to engage the side of the facing U-shaped member 83 to lend rigidity to the structure and it will be obvious the bearing members may be adjusted by adjusting the bolts 84.

A sheet metal cover or the like 158 is provided for the motors and crank discs and crank arm mechanism. It will be noted the helve arms 110 and 111 and the tamping shafts work in the compartments 76 formed by the I-beams 71.

Mounted upon the front portion of the main frame of the vehicle by plates or the like, particularly the crossbars 13 and 15, is an engine 155 having fuel supply tank 156, a transmission housing as indicated at 157 including a drive shaft 158 connected with a shaft 159 which in turn connects with a shaft 160 of a pump 161. Also mounted upon the frame of the tractor to the rear of the pump 161 is a pump 163 for operating the tractor proper, a pump 164 is mounted on the frame of the tractor for operating the hydraulic cylinders of the axle suspension to control the frame as will hereafter be described. A housing 165 is provided for the pump mechanism as well as the controls therefor.

A standard 166 having one end welded or otherwise suitably secured to one side of the tractor frame has a laterally extending arm to which a bracket 166' of a seat 167 is attached by a bolt or the like 168. A steering wheel 169 is mounted on a steering shaft 170 having connection with steering apparatus leading to the front and rear axles as described and illustrated in my copending application, Serial No. 549,353, filed November 28, 1955, now Patent No. 2,852,992, whereby the front wheels are steered independently of the rear wheels. The seat mechanism is within reach of a panel 171 upon which the valve controls are mounted as will also later be described. The reservoir for the fluid for the hydraulic system is located within the housing 165 for operating the hydraulic cylinders, also as later described.

Referring to the hydraulic fluid system for operating the vehicle and the apparatus carried thereby as set out in Fig. 13, 172 designates the reservoir for the hydraulic fluid. A line 173 leads from the reservoir to the pump 161 and a line 173' leads to valves 174 and 175 having lines 176 and 177 and 178 and 179 leading to the cylinders 30 and 31 respectively. The line 173' also connects with a valve 180 having lines 181 and 182 having connections with the hanger cylinders 32 and 33. Cylinders 30 and 31 may be operated individually or simultaneously whereas the cylinders 32 and 33 are operated simultaneously. The operation of cylinders 30 and 31 individually is for the purpose of retaining the frame in horizontal position when the rear wheels of the vehicle are on rough terrain as illustrated in Figs. 7 and 8. The operation of the front cylinders 32 and 33 are simultaneous to raise or lower the front end of the vehicle with respect to the rear. It will also be obvious that the rear cylinders may be operated simultaneously to raise and lower the frame of the vehicle, as illustrated in Figs. 5 and 6. Valves 174, 175 and 180 have a return line 183 leading back to the reservoir 171.

The vehicle is operated by front and rear drives hydraulically through operation of a valve 187. Motors 184 and 185 are provided for driving the front and rear axles respectively for moving the vehicle and are operated by pump 163 by a line 186 connecting to a four-way valve 187 having lines 188 and 189 leading to the motor 184 for driving of the front axle. Lines 190 and 191 connect with lines 188 and 189 and lead to motor 185 for driving the rear axle of the vehicle. A line 192 leads from the reservoir to pump 164 and to a two-way valve 193 which has a line 194 connecting with line 186 which may be used as auxiliary driving power when the vehicle is being moved from one position to another and the motors for driving the tamping units are not in use.

A valve 195 is connected to the two-way valve 193 by a line 196. Lines 197 and 198 lead from the valve 195 to the motors 123 to 130, respectively, for operation of the motors through operation of the pump 164. A return line 199 leads from the valve 195 to the reservoir 171. When the two-way valve 193 is open, the pump will operate the motors for driving the tamping elements. When the two-way valve is closed, then the pump may be utilized for driving the vehicle in addition to pump 163 as previously mentioned.

Also connected in line 173 is a valve 200 and a valve 201 for the steering mechanism of the apparatus. The valve 200 has lines 202 and 203 leading to hydraulic cylinders 204 which are mounted on the frame near the rear axles of the vehicle as stated in my co-pending application referred to above for steering the rear wheels independently of the front wheels. Also leading from the valve 201 are lines 205 and 206 leading to cylinder 207 mounted on the frame near the front wheels having steering connection with the front wheels also as shown in my copending application referred to above. With this arrangement, the front wheels of the vehicle may be operated independently of the rear wheels through operation of the valve 201. The valve 201 is also connected to return line 183 leading to the reservoir and valve 200 is also connected to valve 201 and would have the same return line.

In operation of the apparatus assembled and constructed as described, the vehicle may be moved to a place of use by raising the vehicle frame 2 sufficiently that the compactor apparatus, hence the tamping heads, is a proper distance above the terrain by operation of hydraulic cylinders 30, 31, 32 and 33 as previously described, and by operation of the levers on the control panel as illustrated at 210 (Fig. 2) by the operator of the apparatus from the seat of the vehicle whereby the operation of the engine 155 will drive the pump 163 through shaft connection 158 with 159 and 160, respectively, to the hydraulic motors 184 and 185 on operation of the valve 187. Should additional power be necessary or desirable, opening of the two-way valve 193 pump 164 will be utilized to supply additional fluid to the motors 184 and 185. When the vehicle is moved to the site where the earth is to be tamped, the frame 2 is lowered sufficiently whereby the tamping heads may contact the earth, and should the terrain be uneven and it is desired to level the frame of the vehicle, operation of the levers to valves 175 and 174 will cause the pump 161 to direct fluid from the reservoir to the hydraulic cylinders 30 and 31 for adjustment of the rear of the vehicle through raising and lowering of the pistons in the cylinders. The cylinders will operate for leveling of the frame in either direction depending upon which rear wheel is high or low. The operation of the valve 180 will cause the fluid to flow to cylinders 32 and 33 for operation of the piston therein for raising and lowering of the front end of the vehicle with respect to the rear. The rear end of the vehicle may also be raised and lowered in straight line position, if desired. I have here shown only operation of the cylinders 32 and 33 simultaneously in view of the torque mounting of the frame structure; however, if it is desired, these cylinders could be operated independently of one or the other by the addition of another valve and line arrangement.

When the frame is leveled, then operation of valve 195 will cause the pump to supply fluid from the reservoir to the motors 123 to 130, inclusive, for operation of said motors to drive the crank discs through the chain and sprocket connections. The cranck discs carrying the crank pins having the helve arm action connection with the tamping shafts will cause the shafts to be raised and lowered hydraulically, the helve arm arrangement working in the open ways of the frame 71. The chain and sprocket connection of the motors with the crank discs and in turn with the crank pins is so arranged that the tamping heads will act in pairs, for instance, tamping heads 141 and 148 strike the earth at the same time and the heads 142 and 147, and 143 and 146, and 144 and 145, also act in pairs so that undue strains will be relieved from the apparatus which is usually caused by tamping heads of this character striking the ground simultaneously.

It will be obvious from the foregoing that the series of hydraulic motors having their connection with the crank discs as shown will eliminate twist of the crank shafts or pins. The particular mounting of the subframe for leveling of the frame proper of the vehicle also eliminates strains and stresses from the equipment.

It will be obvious from the foregoing that I have provided an improved compound compactor apparatus operable by the hydraulic fluid of a vehicle in which the framework may be retained in a horizontal position on uneven terrrain and in which the multiple compactors are driven on a crank shaft by a plurality of motors to prevent twisting of the shafts.

What I claim and desire to secure by Letters Patent is:

1. A compactor comprising, a mobile vehicle having a vehicle frame, transverse shafts mounted beneath said frame in spaced relation and spaced from the ends of said vehicle frame, a sleeve member rotatably mounted on each end portion of said shafts, an arm fixed to each of said sleeves and extending longitudinally of said frame toward the corresponding end thereof, said arms on each of the respective shafts being a pair of laterally spaced arms, a transverse axle housing below each end of said frame, a rotatable sleeve on the end of each of said arms, one of said rotatable sleeves being fixedly mounted to one end portion of the axle housing below the adjacent end of said frame and the other of said rotatable sleeves being rotatably mounted on the opposite end portion of the respective axle housing, hydraulic extensible means one at each end of the axle housings and having one end pivotally connected thereto, means pivotally connecting the other end of each of said extensible means to the vehicle frame whereby said extensible means are substantially upright and selective extension and contraction of said hydraulic extensible means raises and lowers said vehicle frame relative to the respective end of said axle housing for selectively leveling and tilting said vehicle frame, said laterally spaced arms and hydraulic extensible means cooperating with said vehicle frame to form a stable connection of the axle housing to the vehicle frame, spaced partitions intermediate the ends of said box and parallel thereto, a transverse bar below said vehicle frame and fixed thereto adjacent said box, a plurality of spaced guides supported along the length of said bar, a vertically slidable tamping bar in each of said guides, motor means supported by the vehicle frame, and means including resilient members operatively connecting said motor means with said tamping bars for reciprocating same in their respective guides whereby extension and contraction of said hydraulic extensible means positions lower ends of said tamping bars relative to a surface under the vehicle frame and reciprocation of said tamping bars provide resilient hammer impacts for compacting operations which may strake material being compacted at various heights transversely of the vehicle without lifting said vehicle frame by force of the impacts.

2. A compactor comprising, a mobile vehicle having a vehicle frame, transverse shafts mounted beneath said frame in spaced relation and spaced from the ends of said vehicle frame, a sleeve member rotatably mounted on each end portion of said shafts, an arm fixed to each of said sleeves and extending longitudinally of said frame toward the corresponding end thereof, said arms on each of the respective shafts being a pair of laterally spaced arms, a transverse axle housing below each end of said frame, a rotatable sleeve on the end of each of said arms, one of said rotatable sleeves being fixedly mounted to one end portion of the axle housing below the adjacent end of said frame and the other of said rotatable sleeves being rotatably mounted on the opposite end portion of the respective axle housing, hydraulic extensible means one at each end of the axle housings and having one end pivotally connected thereto, means pivotally connecting the other end of each of said extensible means to the vehicle frame whereby said extensible means are substantially upright and selective extension and contraction of said hydraulic extensible means raises and lowers said vehicle frame relative to the respective end of said axle housing for selectively leveling and tilting said vehicle frame, said laterally spaced arms and hydraulic extensible means cooperating with said vehicle frame to form a stable connection of the axle housing to the vehicle frame, a rectangular box open at the top and bottom and supported transversely on an intermediate portion of said vehicle frame, spaced partitions intermediate the ends of said box and parallel thereto, a transverse bar below said vehicle frame and fixed thereto adjacent said box, a plurality of spaced guides supported along the length of said bar and centrally disposed in substantially vertical alignment with the center of said box between adjacent partitions, a vertically slidable tamping bar in each of said guides, a series of aligned shafts mounted on adjacent partitions, crank means carried by said aligned shafts above each of said guides, means for rotating said crank means, pairs of opposed arms with each pair having upper ends rotatably connected to a respective crank means, links pivotally connecting the upper portion of the tamping bars to the lower ends of the respective pair of opposed arms whereby said pairs of opposed arms move apart responsive to force caused by impact of the tamping bar striking material to be compacted, and resilient means between said opposed arms of each pair to yieldingly resist moving apart of said arms whereby rotation of said crank means reciprocates said tamping bars in their respective guides and provide resilient hammer impacts for compacting operations which may strike material being compacted at various heights transversely of the vehicle without lifting said vehicle frame by force of the impacts.

References Cited in the file of this patent

UNITED STATES PATENTS

| | | |
|---|---|---|
| 429,807 | Dupont | June 10, 1890 |
| 619,426 | Mauger | Feb. 14, 1899 |
| 681,715 | Layne | Sept. 3, 1901 |
| 890,659 | Kellner | June 16, 1908 |
| 1,129,230 | Powers | Feb. 23, 1915 |
| 1,275,742 | Pritchard | Aug. 13, 1918 |
| 1,887,341 | Venable | Nov. 8, 1932 |
| 2,537,572 | Cole | Jan. 9, 1951 |
| 2,556,610 | Biszantz | June 12, 1951 |
| 2,621,055 | O'Kelley | Dec. 9, 1952 |
| 2,659,584 | Dorkins | Nov. 17, 1953 |
| 2,732,197 | Cornett | Jan. 24, 1956 |
| 2,784,978 | Seale | Mar. 12, 1957 |